(12) United States Patent
Alley et al.

(10) Patent No.: US 6,487,264 B1
(45) Date of Patent: Nov. 26, 2002

(54) RF MODEM APPARATUS

(75) Inventors: Daniel Alley, Wyoming; Jimmy Chess, Goshen; Roger Dickerson, Loveland; Thomas C. Nguyen, Westchester, all of OH (US)

(73) Assignee: Xetron Corporation, Cincinnati, OH (US)

( * ) Notice: Subject to any disclaimer, the term of this patent is extended or adjusted under 35 U.S.C. 154(b) by 0 days.

(21) Appl. No.: 09/310,219

(22) Filed: May 12, 1999

(51) Int. Cl.[7] .............................. H04B 1/38; H04Q 9/00
(52) U.S. Cl. ...................... 375/361; 375/222; 375/282; 375/312; 340/825; 455/343
(58) Field of Search .................................. 375/222, 309, 375/361, 257, 311, 282, 223, 312; 379/3.01; 710/31, 32; 340/870.01, 870.04, 825, 825.14, 825.19, 825.2; 455/343; 178/66.2, 71.4, 101

(56) References Cited

U.S. PATENT DOCUMENTS

| | | | |
|---|---|---|---|
| 4,322,854 A | * 3/1982 | Bundens et al. ................ 455/5 |
| 4,614,945 A | 9/1986 | Brunius et al. ......... 340/870.03 |
| 4,786,903 A | 11/1988 | Grindahl et al. ........ 340/825.54 |
| 4,799,059 A | 1/1989 | Grindahl et al. ........ 340/870.03 |
| 4,876,700 A | 10/1989 | Grindahl ........................ 375/87 |
| 5,200,980 A | * 4/1993 | Briddell ......................... 375/83 |
| 5,448,230 A | 9/1995 | Schanker et al. ....... 340/870.03 |
| 5,451,938 A | * 9/1995 | Brennan, Jr. ............ 340/870.14 |
| 5,553,094 A | 9/1996 | Johnson et al. .............. 375/200 |
| 5,673,252 A | 9/1997 | Johnson et al. ............. 370/94.1 |
| 5,774,502 A | * 6/1998 | Belcher et al. .............. 375/283 |

* cited by examiner

Primary Examiner—Don N. Vo
Assistant Examiner—Dung X. Nguyen

(57) ABSTRACT

An RF modem used with a host device for transmitting information to, and receiving information from, other host devices. Prior to a transmission, the information is Manchester encoded and transmitted by On/Off Keying. A superregenerative receiver circuit (which may also operate as the transmitter) operating at the transmitted frequency detects the transmitted information. The information is recovered in conjunction with a timing function which times the buildup of RF energy within the receiver circuit so that a transmitted binary 1 can be distinguished from a binary 0. For use in a system with a plurality of hosts, multiple channels of operation are provided. In order to conserve power, the apparatus is operated in a power saving, sleep or scanning mode, as well as a full power active mode.

24 Claims, 15 Drawing Sheets

RF MODEM APPARATUS

BACKGROUND OF THE INVENTION

1. Field of the Invention

The invention in general relates to information transfer from one device to another, and more particularly to an improved radio frequency (RF) arrangement for accomplishing the transfer.

2. Description of Related Art

Various systems exist wherein information is to be transferred from one location to another such as in remote monitoring, data collection, computer-to-computer information exchange, parcel tracking and delivery systems, to name a few.

In order to eliminate the need for a hardwire connection between devices of the system, use is made of an optical coupling or an RF modem to transmit and/or receive such information, thus providing a high degree of portability, within a given range.

Optical coupling arrangements require an unobstructed optical transmission path or, for a more positive transfer, a physical coupling of a device with a docking mechanism.

RF modems are widely used to eliminate the problems associated with hardwired or optical arrangements. For many applications existing RF modems may be too large to be incorporated into a relatively small host device. In addition, these RF modems are expensive and require relatively frequent battery charges.

The present invention provides an RF modem which can be used for secure and reliable information transfer and which RF modem is relatively small and inexpensive, with reduced power consumption.

SUMMARY OF THE INVENTION

An RF modem coupled to a host device is provided for transmitting RF information signals to, and receiving RF information signals from, another RF modem coupled to a host device, in an array of host devices. The modem preferably utilizes a superregenerative circuit for transmission and reception of information encoded in a binary format and transmitted by Manchester encoded On/Off keying. Recovery of information is accomplished by obtaining time indications of oscillator waveform buildup to a certain level in the superregenerative circuit. The modem is operable in an active mode of operation as well as a power saving idle mode which is comprised of a sleep mode of operation, in which no scanning for the presence of RF signals is performed, and a power saving scanning mode of operation in which the modem scans for the presence of RF signals.

DESCRIPTION OF THE PREFERRED EMBODIMENT

Figure 1:
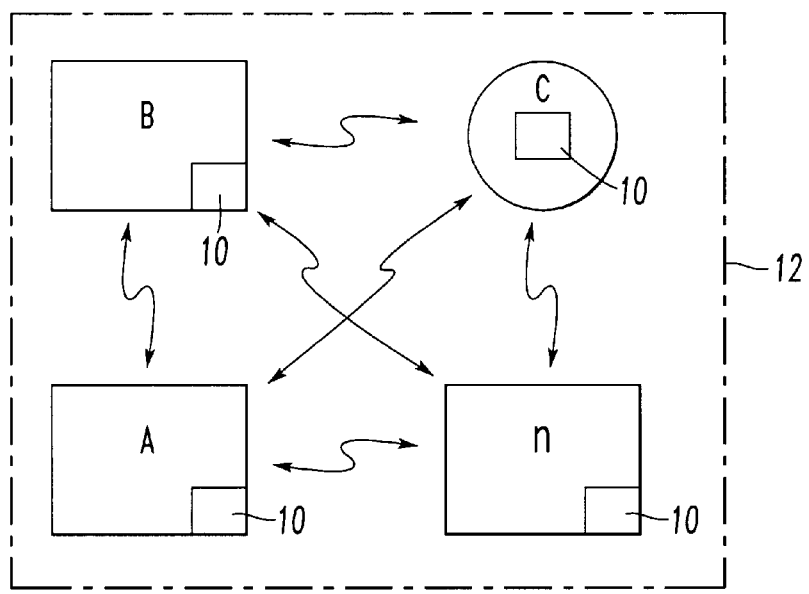
FIG. 1 is a block diagram of a system which utilizes the modem of the present invention.

In the drawings, which are not necessarily to scale, like or corresponding parts are denoted by like or corresponding reference numerals.

The RF modem of the present invention finds utility in a variety of system architectures, one of which is illustrated in FIG. 1, by way of example. In FIG. 1, a plurality of host devices A, B, C . . . n each include an identical RF modem 10, mounted internally or externally, whereby the host devices can communicate with one another to transfer information which has been entered into the host device such as by a scanning wand, keypad, keyboard, wire input, or the like. The host devices A, B, C . . . n, which may be identical, dissimilar or a combination of like and different designs, constitute an array 12.

The information contained in one or more host devices may be transferred to a remote location such as intermediate unit 14, which also includes an RF modem 10. Depending upon the application, the intermediate unit 14 may be additionally operable to communicate with a distant central control 16 either by telephone or other hardwire connection, or by RF communication, as indicated by respective links 17 and 18. For example, the host devices may be part of a parcel delivery system to automate the task of parcel tracking and delivery. In such system, the intermediate unit 14 may be a delivery truck, and delivery or pick-up of a designated parcel may be instantly recorded at the central control location 16.

Figure 2:
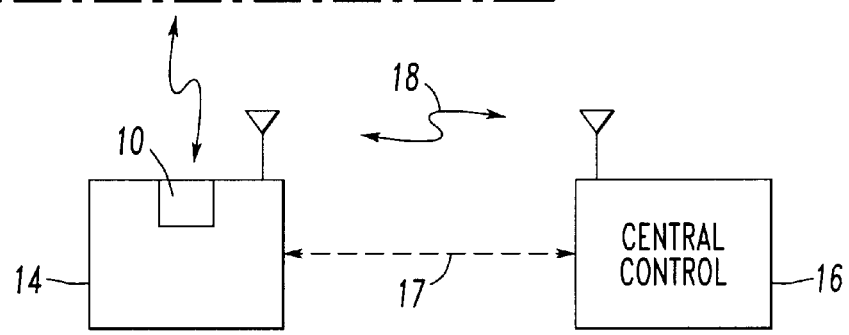
FIG. 2 is a block diagram of the modem.
Figure 2:
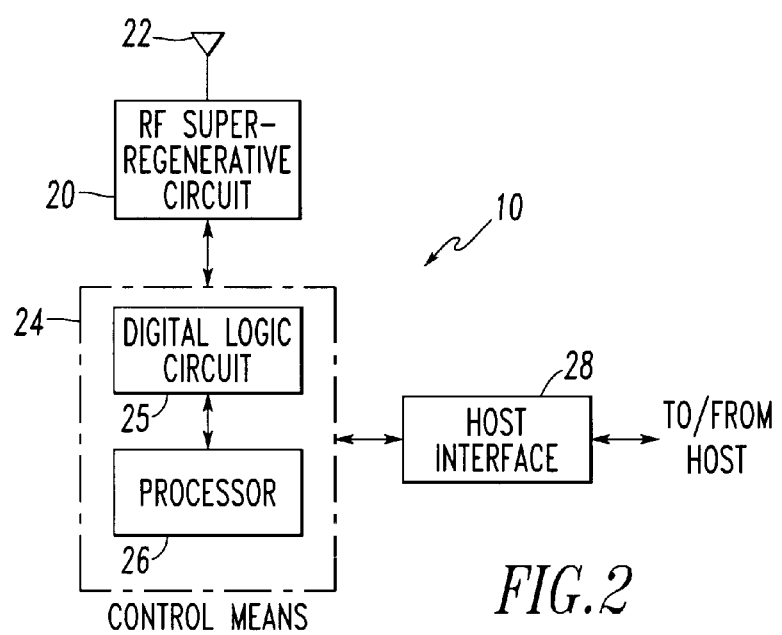

An overall block diagram of an RF modem in accordance with the present invention is illustrated in FIG. 2. The RF modem 10 includes an RF section for the actual transmission and reception of RF energy, modulated by the information to be transferred. The RF section is constituted by a superregenerative circuit 20 which transmits and receives the RF energy via a single antenna 22. A superregenerative circuit 20 is utilized in view of its low cost, low power consumption, simplicity, good sensitivity, small size and low component count.

Operation of the superregenerative circuit 20 is governed by a control means 24 which may be a fast microprocessor or, as illustrated, may be a combination of a digital logic circuit 25 and processor 26. The digital logic circuit 25 is an ASIC (application specific integrated circuit) of a design to be described, while the processor 26 may be an inexpensive off the shelf item such as Atmel corporation's RISC microcontroller model AT90S8515.

The RF modem 10 is resident in a host device and information which is to be transmitted from that host device to another host device is transferred by a signal transfer means in the form of host interface 28. Similarly, certain received information is placed into the host device also via the host interface 28.

Figure 3:
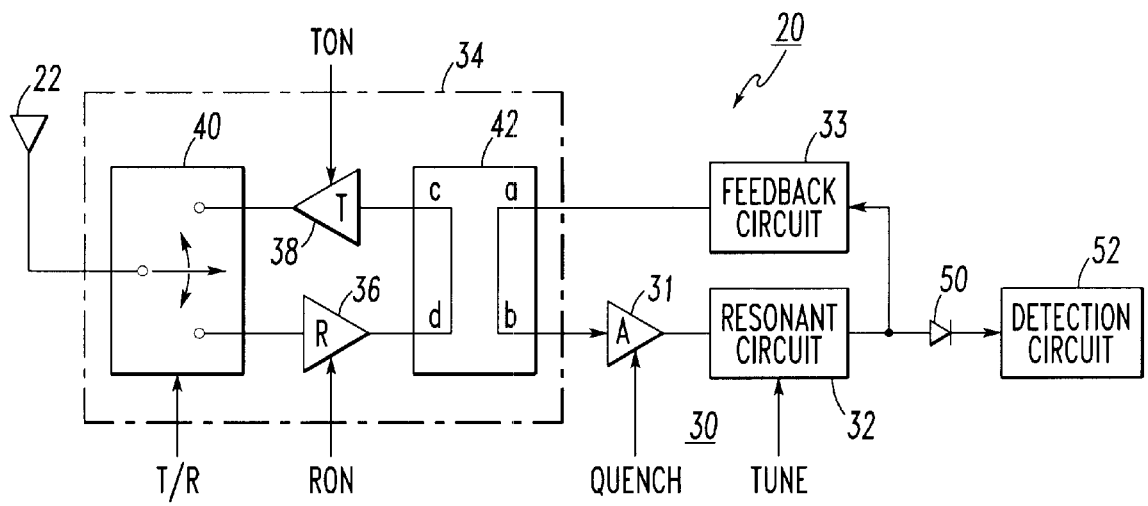
FIG. 3 illustrates the RF superregenerative circuit of FIG. 2 in more detail.

The superregenerative circuit 20 is illustrated in more detail in FIG. 3, and includes a superregenerative oscillator 30 comprised of an amplifier 31 and resonant circuit arrangement 32, the output of which is coupled back to the input of amplifier 31 via feedback circuit 33. The superregenerative circuit 20, in conjunction with the antenna 22 serves as an RF receiver in which oscillations, at a frequency determined by the resonant circuit 32, are allowed to build up but are periodically shut down by means of a control signal known as a quench signal. In FIG. 3 a QUENCH signal, by way of example, is applied to the amplifier 31 and when the signal is asserted, for example, in a high state, it will turn off the amplifier and cause the cessation of oscillations, and when deasserted, that is, placed in a low state, it will establish conditions conducive for oscillations. Such QUENCH signal alternatively may be applied to the resonant circuit arrangement 32 to decrease its quality factor Q, to establish oscillatory and non-oscillatory conditions.

In a scenario wherein relatively few host devices are used, the resonant circuit arrangement 32 may be set for a fixed frequency. However, in a preferred embodiment, to allow for a larger plurality of host devices, the resonant circuit arrangement 32 is tunable to a plurality of different frequencies by means of a TUNE signal. For example, with four different TUNE signal voltages the superregenerative receiver can operate on four different frequencies representing four different channels. Such frequencies may be closely spaced and may be selected from the 2.4 GHz, or other ISM (Industrial, Scientific, Medical) band, by way of example.

As a cost and space saving measure, the superregenerative circuit 20 is also operable as the transmitter for the RF modem 10. Binary information is transmitted and the preferred modulation technique, when operating as a transmitter, is On/Off Keying wherein the amplifier 31 is turned on for a predetermined period of time to transmit a binary 1 and is simply turned off for a predetermined period of time to represent a binary 0.

When operating as a receiver, oscillator reradiation is of a concern in that the superregenerative circuit 20 while receiving can simultaneously transmit and cause interference with other host devices. To minimize this effect, decoupling means 34 is provided between the antenna 22 and the amplifier 31.

The decoupling means 34 includes a receive amplifier 36 which is placed into operation by means of signal RON, and a transmit amplifier 38 which is placed into operation by means of signal TON. An electronically operated transmit/receive switch 40, in response to signal T/R, will selectively connect the antenna 22 to the receive amplifier 36 when listening for RF information signals and will connect the antenna 22 to the transmit amplifier 38 when information is to be transmitted.

Further decoupling is accomplished with the provision of a directional coupler 42 having port a connected to the feedback circuit 33, port b connected to the input of amplifier 31, port c connected to the input of transmit amplifier 38 and port d connected to the output of receive amplifier 36.

Figure 3A:
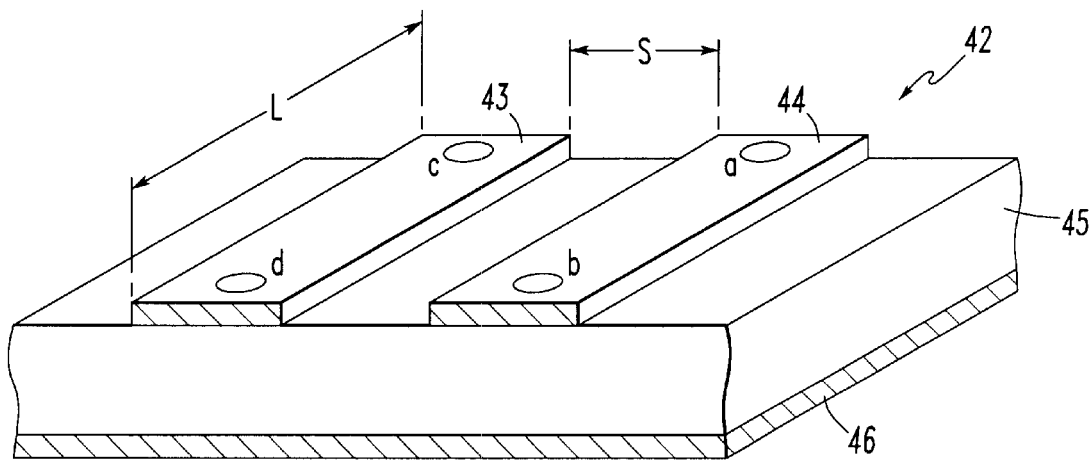
FIG. 3A shows one type of signal coupling arrangement used in FIG. 3.

One type of directional coupler which may be utilized is further illustrated in FIG. 3A. The directional coupler 42 illustrated in FIG. 3A is a 4-port 90° hybrid splitter which includes microstrip lines 43 and 44 having respective terminals a, b, c and d corresponding to those illustrated in FIG. 3. The microstrip lines 43 and 44, positioned upon a dielectric substrate 45 having a ground plane 46, are each of a length L and are spaced apart by a distance S, where S determines the coupling factor and L is a quarter wavelength ($\lambda/4$) at the operating frequency. If the superregenerative circuit is designed for operation at a plurality of different frequencies, satisfactory operation of the directional coupler may be obtained if L is selected to be $\lambda/4$ at one of the operating frequencies or at a geometric mean of all of the contemplated operating frequencies.

With reference once again to FIG. 3, the superregenerative circuit 20 includes a diode detector 50 which in the receive mode of operation samples the voltage in the oscillator 30 and is coupled to a detection circuit 52 wherein certain time measurements are made to recover the transmitted information.

More particularly, when the QUENCH signal is low and the circuit is allowed to oscillate, the oscillation amplitude will build up. If RF energy at the oscillator frequency, representing a binary 1, is received from another host, the oscillations will reach a certain magnitude in a relatively short period of time. If no RF energy signal is received, oscillations will still occur simply due to thermal noise which is always present. These latter oscillations, however, will build up to the certain magnitude in a relatively longer period of time. This operation is illustrated in FIG. 4.

Figure 4:
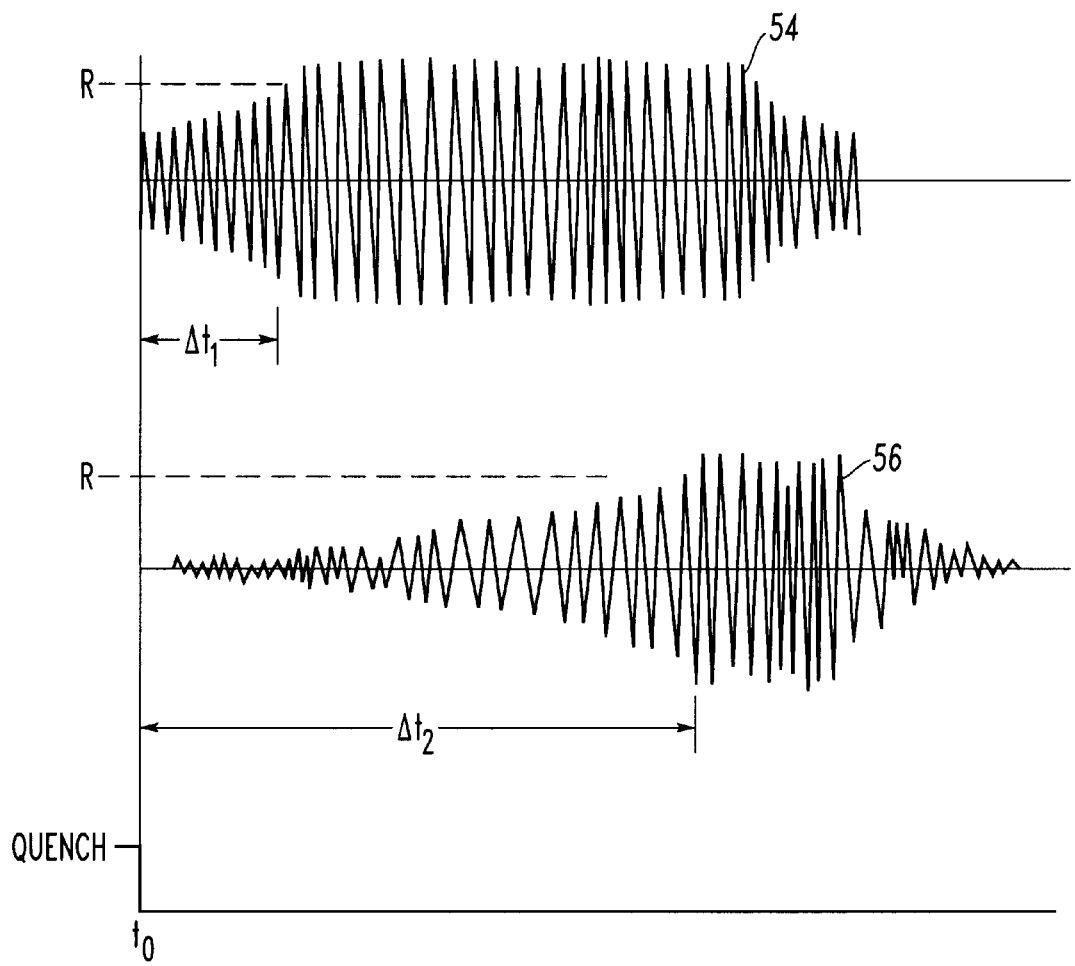
FIG. 4 shows RF waveforms to aid in an understanding of the operation of the modem.

At time $t_0$ in FIG. 4, the QUENCH signal state allows oscillations to commence. Curve 54 represents the buildup of oscillations from time $t_0$, wherein RF from the antenna is present, to some reference value R in a period of time $\Delta t_1$ due to the presence of the RF signal. In the absence of such RF signal, and as represented by curve 56, the oscillations will take a longer period of time, $\Delta t_2$, to build up and reach the magnitude R. The present invention utilizes these time differences to recover a signal, such as a binary bit pattern being received from another host.

Figure 5:
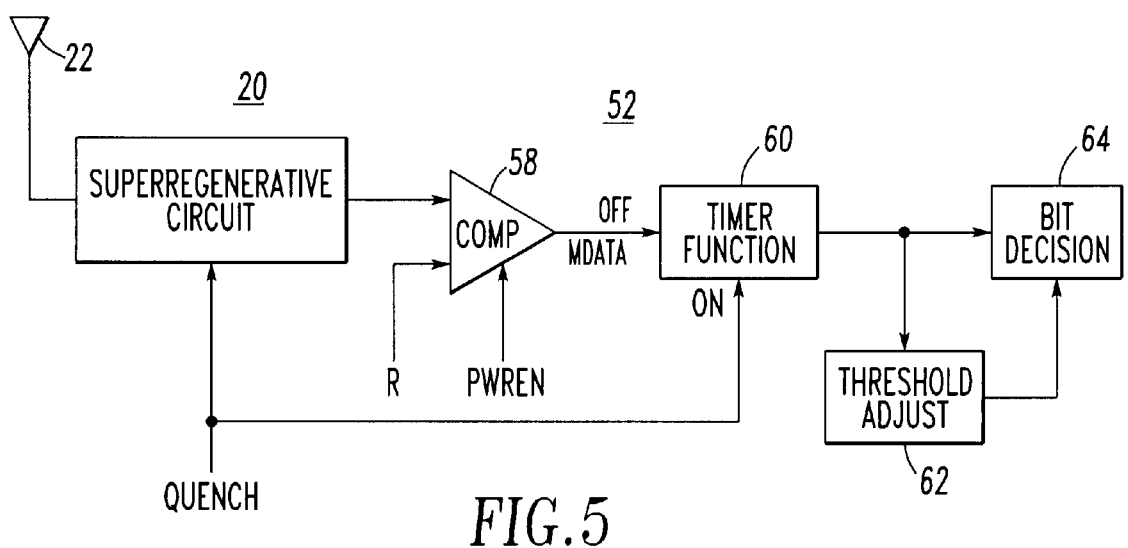
FIG. 5 is a block diagram illustrating a timing function.

As illustrated in the functional block diagram of FIG. 5, the output of superregenerative circuit 20 (from diode detector 50 in FIG. 3) is provided to a comparator 58 which is turned on during a receive operation by means of power enable signal PWREN. The comparator 58 also receives a comparator reference input of predetermined value R, and when the diode detector output achieves a value of R, the comparator will provide a corresponding output signal.

When the QUENCH signal goes low, or deasserts, a timer function in block 60 commences. An output MDATA from comparator 58, signifying that the reference level has been attained, shuts off the timer function and thus time values such as $\Delta t_1$ and $\Delta t_2$ (FIG. 4) are accumulated during a sampling cycle.

Based upon the samples, a threshold value is established by threshold adjust function 62, and the individual timing count samples are compared with the established threshold. If a sample count is lower than the threshold, it represents a binary 1 whereas if a count is higher than the threshold it represents a binary 0 (for example $\Delta t_1$ representing a 1 in FIG. 4 is less than $\Delta t_2$ representing a 0).

Figure 6:
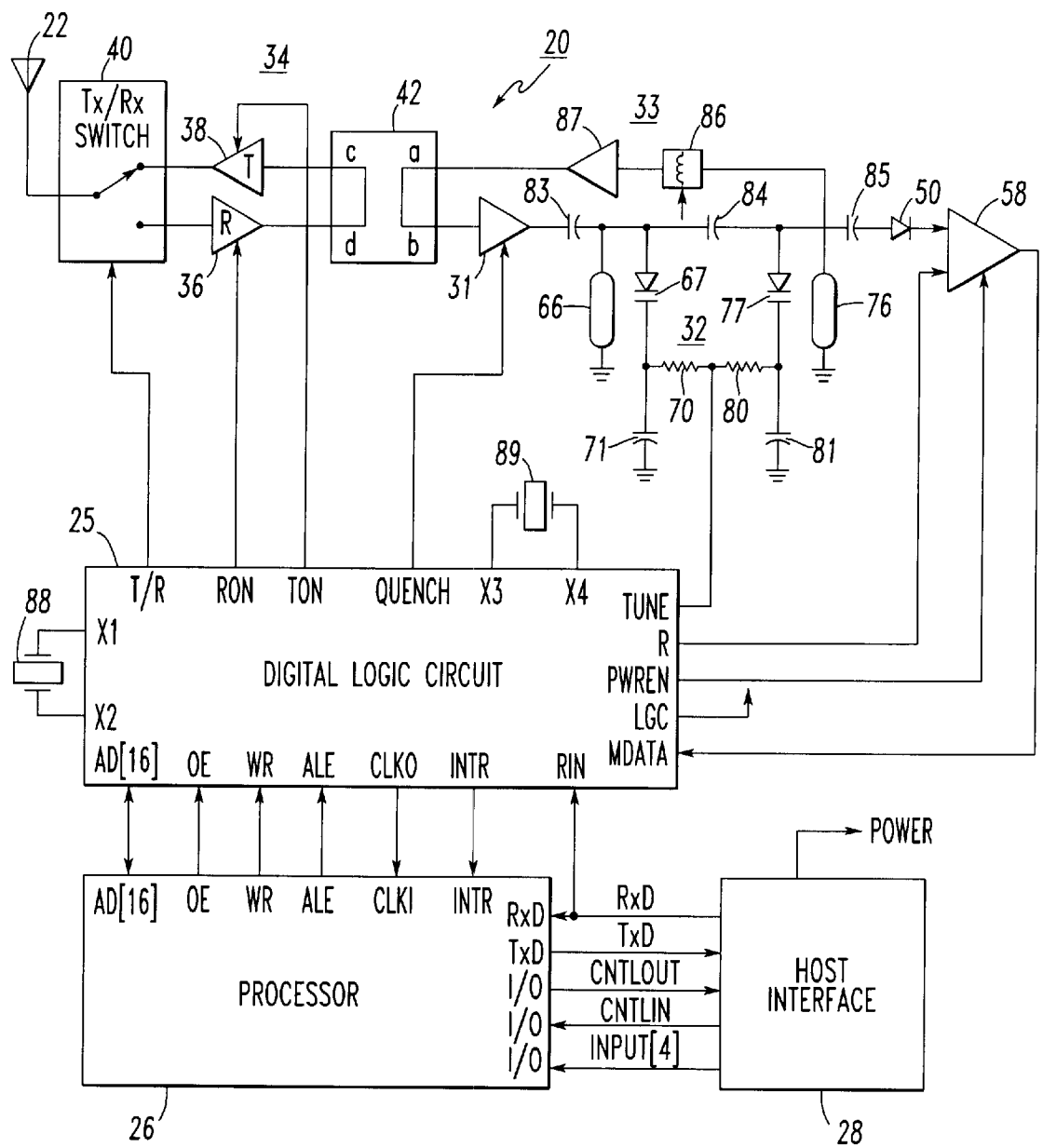
FIG. 6 illustrates the components of FIG. 2 in more detail.

As will be described, the functions of blocks 60, 62 and 64 reside in the digital logic circuit 25, as illustrated in FIG. 6, which also shows the resonant circuit arrangement 32 in more detail. The arrangement includes a ceramic resonator 66 which, in conjunction with varactor 67 determines the resonant, or operating frequency of the oscillator 30. The circuit is tuned by application of a predetermined voltage applied to the varactor 67, which sets its capacitance value. This tuning voltage is provided by the digital logic circuit 25 and is applied, via resistor 70 to the junction between varactor 67 and capacitor 71, which functions as a decoupling mechanism for any RF signals.

In order to improve the frequency selectivity, a second resonator 76 may be provided in conjunction with a second varactor 77, with digital logic circuit 25 supplying a tuning voltage, via resistor 80, to the junction between varactor 77 and capacitor 81. Coupling capacitors 83, 84 and 85 are provided between stages.

The rate at which oscillations build up is governed by the gain around the oscillator loop and the in-circuit Q of the resonators 66 and 76. In a rudimentary form, the feedback circuit 33 may be constituted by a single conductor. However, it is desirable to regulate the rate at which oscillations build up in order to prevent normal circuit variations from causing the oscillator build up time to be outside the timing range for which the time measuring circuits were designed. This may be accomplished by the provision of controllable attenuator 86, as a component of feedback circuit 33, and having a coefficient of attenuation that may be varied by a loop gain control signal, LGC, provided by digital logic circuit 25.

Further, the feedback circuit 33 may additionally include a feedback amplifier 87 to boost oscillations and overcome any resonator losses as well as directional coupler 42 losses.

Digital logic circuit 25 includes a plurality of pin connections including X1 and X2 for accepting a first crystal 88 forming a part of a first, relatively fast oscillator, and X3 and X4 for accepting a second crystal 89 forming a part of a second, relatively slow oscillator.

Other connections include a 16 bit address/data bus AD[16], output enable OE, write WR, address latch enable ALE, and an interrupt INTR. Other illustrated signals will be described in connection with FIGS. 9 to 15.

Connection of the processor 26 with its host is via the host interface 28, with signals being exchanged along I/O lines and transmit and receive data lines TXD and RXD. In addition, the host may also supply battery power for modem operation by means of this interface 28.

The antenna 22 which is used in both transmitting and receiving may be integrated with the superregenerative circuit 20 on a printed circuit board in a manner which can also accommodate the digital logic circuit 25, processor 26 and host interface 28, resulting in a modem which is about the size of a large postage stamp.

Figure 7A:
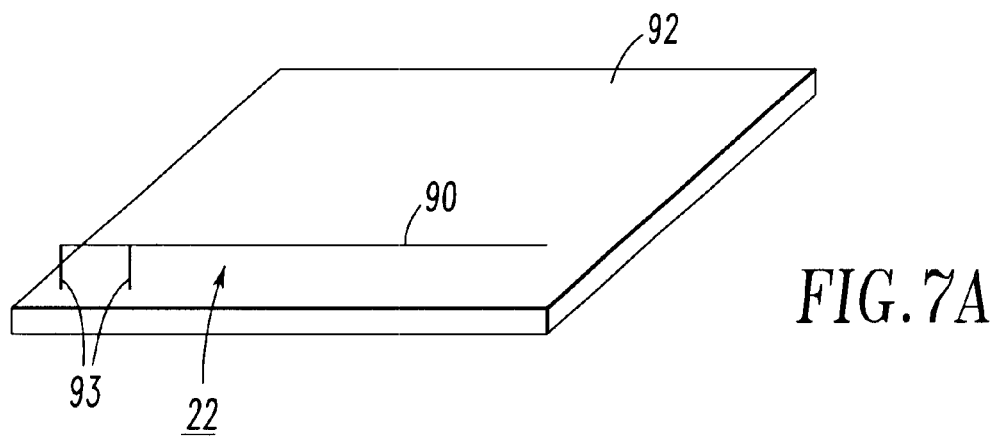
FIGS. 7A, 7B and 7C illustrate antennas for the modem.
Figure 7B:
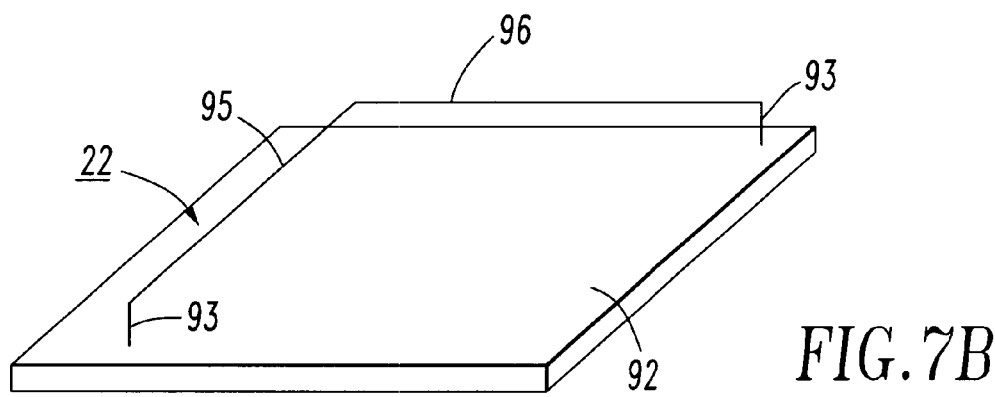

FIG. 7A illustrates one arrangement which utilizes a quarter wavelength rigid wire 90 spaced above the printed circuit board 92, to which the circuit elements of FIG. 2 would be attached. Rigid wire 90 is positioned by means of mounts 93. FIG. 7B is similar, however it illustrates rigid wires 95 and 96, forming a half wavelength design which takes up very little space on the printed circuit board 92. The antennas can be configured and fed several different ways, making them easy to integrate into the RF circuitry. Further, they are resonant, easy to adjust and can provide some preselection filtering.

Figure 7C:
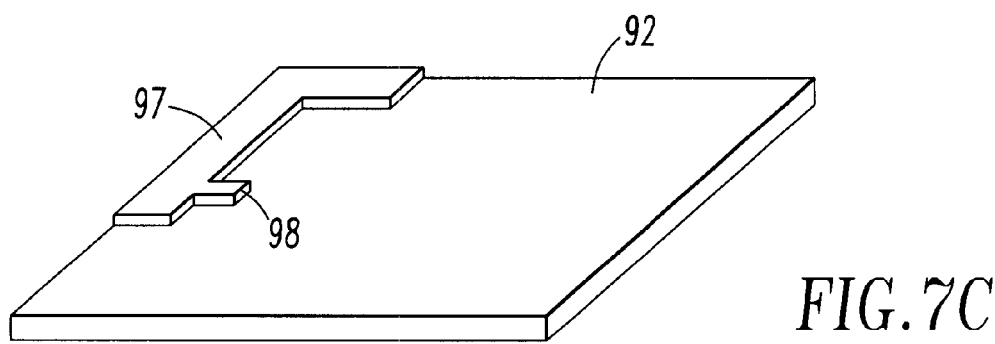

As an alternative, and as illustrated in FIG. 7C, a quarter wavelength (or half wavelength) antenna 97, having an antenna feed point 98, may be etched onto the surface of printed circuit board 92, or any intermediate layer thereof. When incorporated on or in the printed circuit board 92, any metalized area directly below or above the antenna 97 is removed.

Figure 8:
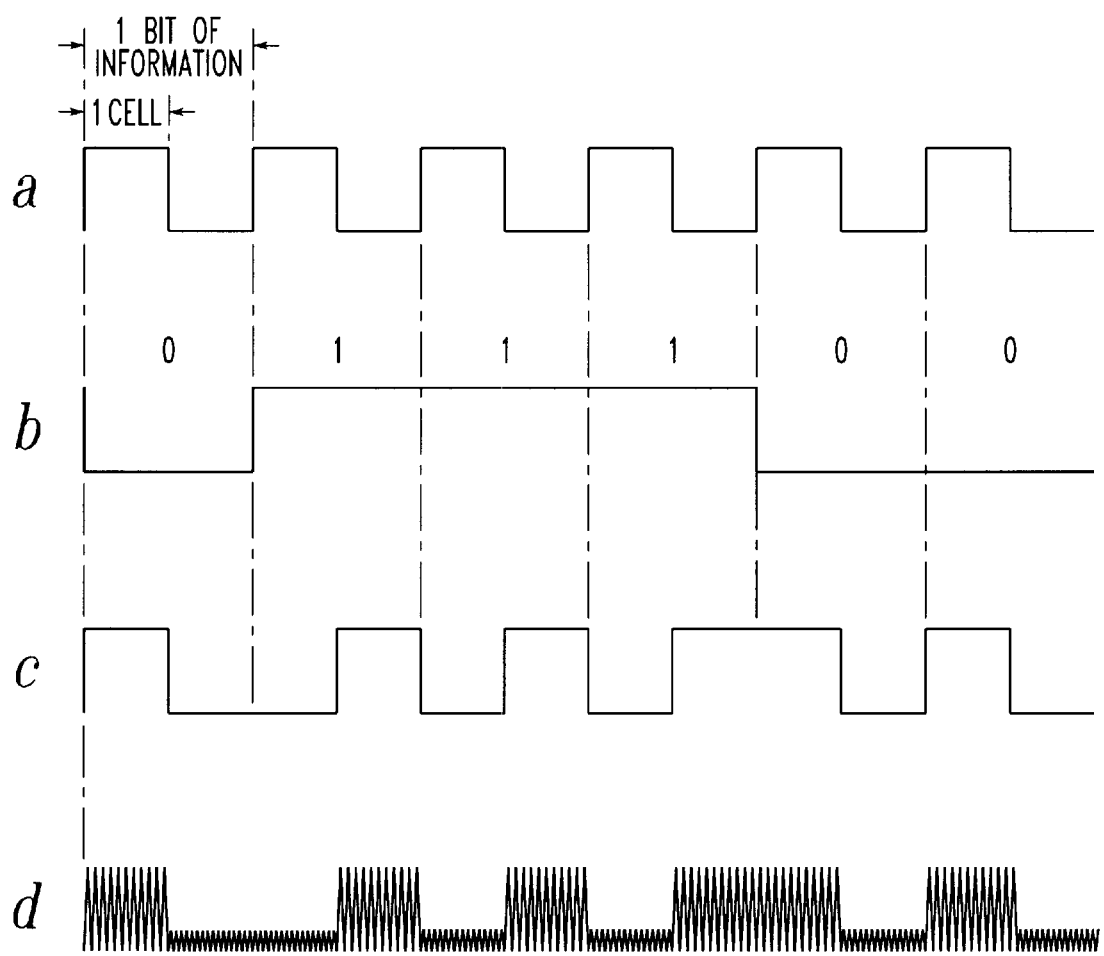
FIG. 8 shows waveforms illustrating one form of encoding which is utilized herein.

In the present invention the binary information to be transmitted is encoded prior to transmission. The preferred encoding utilized is the well-know Manchester encoding technique. The technique utilizes an exclusive OR gate having two inputs. An encoding clock signal is applied to one input and the information bit to be encoded is applied to the other input. FIG. 8 illustrates various waveforms in the process.

The encoding waveform is shown in FIG. 8a, and a portion, 011100, of the information binary signal is shown in FIG. 8b. The result of the exclusive OR operation is illustrated in FIG. 8c and it is seen that for each information bit to be encoded there is always transmitted energy. The bit pattern of FIG. 8c is utilized to transmit the corresponding RF waveform of FIG. 8d by means of On/Off Keying.

The value of the encoded bit is determined by the transition in the middle of the bit time where a positive transition is decoded as a 1 and a negative transition is decoded as a 0. In order to effect decoding, the receiving modem must be in synchronization with the transmitted information pattern from another host. This is accomplished by starting a transmission with a preamble which includes an "illegal" Manchester pattern. More specifically, with Manchester encoding there can be no more than two consecutive cells (see FIG. 8c) of the same binary value. For clock synchronization the preamble starts out with more than the allowed consecutive cells, for example, three. If three 1's in a row are detected the receiver knows that it is a sync signal.

In addition to Manchester encoding the apparatus utilizes an error checking procedure. This is accomplished by a cyclic redundancy check (CRC) which is an error checking algorithm commonly used in serial communication systems.

The digital logic circuit 25 (FIG. 2) provides the logic interfaces between the RF circuitry 20 and the processor 26. Various modes of operation are controlled within the digital logic circuit 25 for power reduction and automatic operations not requiring the processor's direct intervention. This allows for a simpler processor for reduced cost and power. The modes of operation of the digital logic circuit 25 include transmission of RF information packets; reception of possible packets with automatic timing, threshold adjustment, and clock recovery; scanning for possible RF activity without use of processor 26; and controlling a sleep, or low power, mode of operation.

Figure 9:
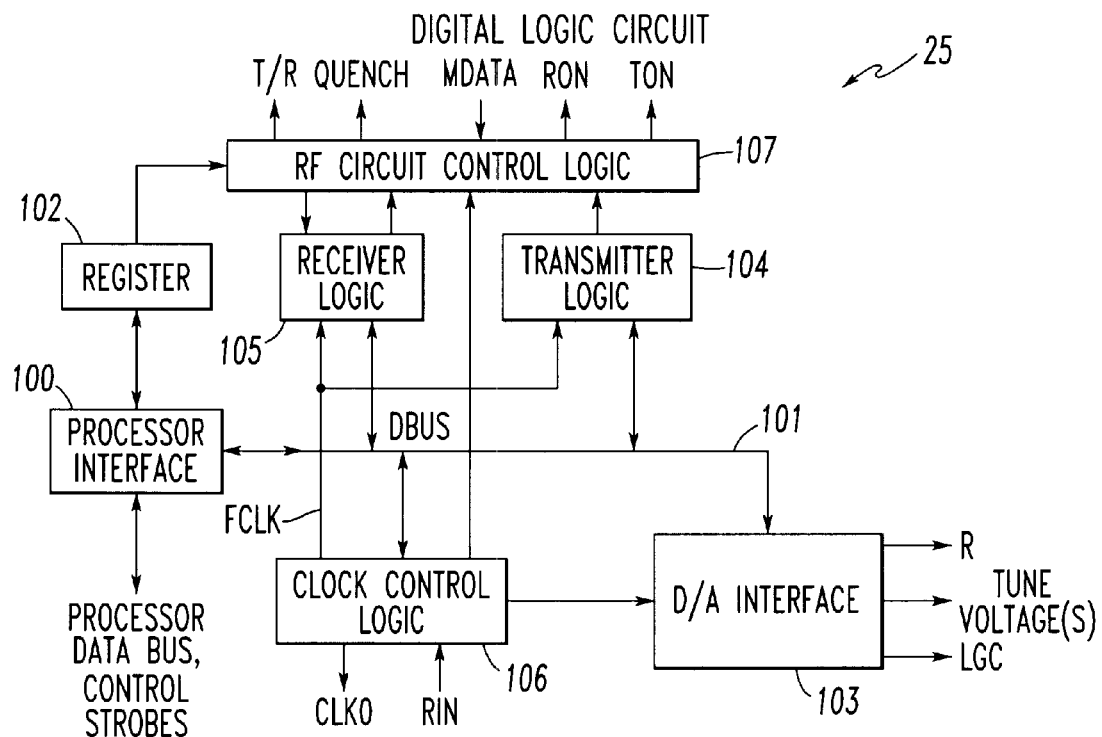
FIG. 9 is a block diagram of the digital logic circuit of FIG. 2.
Figure 10:
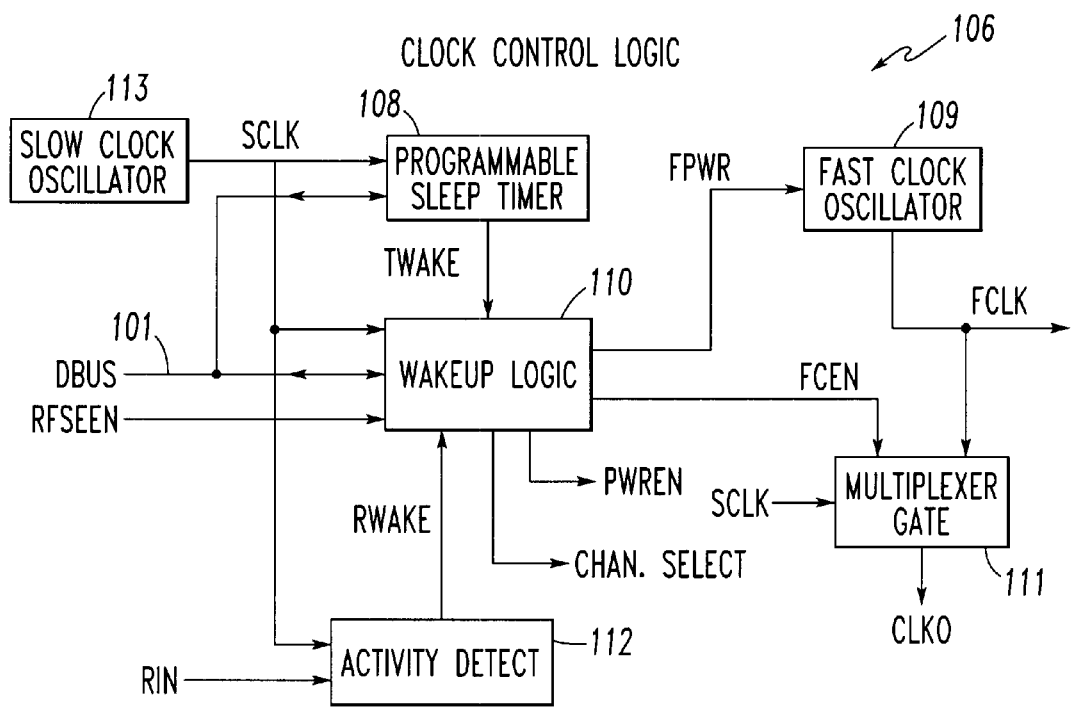
FIG. 10 is a block diagram of the clock control logic of FIG. 9.

The logic contained within the digital logic, circuit 25 includes the following sections as shown in the overall block diagram of FIG. 9: processor interface 100 with data/address demultiplexing, interrupt logic, and control strobe generation; internal data bus 101 connected to all logic programming registers providing a data path to various logic blocks for read/write operations by the processor 26; digital logic circuit control register 102 for overall mode control within the digital logic circuit 25; D/A (digital-to-analog) interface 103 for providing tuning voltages for the superregenerative circuit oscillator 30 as well as a reference voltage R for the comparator 58, and loop gain control signal LGC; transmitter logic 104 for packet format, serialization, transmit CRC, and Manchester encoding; receiver logic 105 for regenerative reception, sync clock extraction, information recovery, and packet received CRC operations; clock control logic 106 for clock and power control within the modem; RF circuit control logic 107 which combines the control lines, receive logic I/O (input/output), and transmitter output to form the RF circuitry control signals.

The RF control circuitry 107 combines the control signals for the transmit and receive sections, forming the following signals:

T/R—T asserted when in the transmit mode; R when in a scan or receive mode

RON—asserted when in scan or receive mode

TON—asserted when in transmit mode

QUENCH—asserted in transmit mode when TXQUENCH asserted, asserted in receive or scan modes when RXQUENCH asserted The processor 2G will select the appropriate mode of operation accessing the processor interface 100 to perform a write to control register 102 of the digital logic circuit 25. All processor reads and writes occur through the processor interface 100 which generates the select signals required to access the internal digital logic circuit 25 registers.

For portable battery operated host devices, conservation of power is a prime consideration. The apparatus accordingly, is operable, by way of example, in a full power active, or "awake" mode and in an idle, power saving mode which includes a "sleep" mode and a scan mode. Minimization of power is accomplished by means of the clock control logic 106 shown in more detail in FIG. 10. The wakeup logic 110 is controlled by the processor 26 via the digital logic circuit 25 internal data bus 101. The processor 26 will write a command to a register in the wakeup logic 110 to put the digital logic circuit 25 into either a power saving sleep mode (minimum power usage) or a power saving scanning mode (slightly higher power usage).

In the sleep mode, a high speed clock (fast) oscillator 109 is turned off when signal FPWR is deasserted and all receiver and transmitter logic circuits are put into a low power mode by deasserting PWREN. With CLKO from multiplexer gate 111 switched to provide a low speed clock, the processor 26 goes into a low power mode and slowly executes it's internal program, waiting for an incoming message. The low speed (slow) clock circuit 113 and programmable timer 108 continue to operate, with the timer 108 activating the wakeup logic 110 after a programmed number of slow clock pulses following the start of the sleep mode. In the sleep mode everything is turned off except the sleep timer 108 and clock oscillator 113. Since power consumption is proportional to frequency x the square of the voltage, the low frequency of clock oscillator 113 ensures for minimum power usage.

The wakeup logic 110 may also be activated by the activity detection logic 112 sensing signal RIN going low, and providing an RWAKE signal indicating the start of information from the modem host. When the wakeup logic 110 is activated, the high speed clock oscillator 109 is powered on by FPWR being asserted. After a small delay to allow the oscillator 109 to settle, signal FCEN is enabled to allow the multiplexer gate 111 to provide a fast clock output signal as CLKO. This causes the processor 26 to resume its normal operation, allowing the processor to continue by reading the status of the digital logic circuit 25 for the cause of the wakeup, that is, either receipt of signal RIN from the host, or a normal timeout.

Prior to the scanning mode, the high speed clock oscillator 109 is turned off with FPWR deasserted and with all receiver and transmitter logic in a low power mode, by deassertion of PWREN. The slow clock circuit 113 and programmable timer 108 continue to operate, with the timer activating the wakeup logic 110 after the programmed number of slow clock pulses following the start of the sleep mode. The wakeup logic 110 then enables the high speed clock circuit 109 by FPWR being asserted. The wake up logic 110 will also select the particular channel to be initially scanned and pass that selection to the D/A interface 103 (FIG. 4). FCEN remains disabled such that the multiplexer gate 111 passes a slow clock as CLKO, keeping the processor 26 in a low power mode. FCLK does go active, allowing the receiver logic 105 (FIG. 9) to begin scanning and sensing for RF energy. If the receiver logic 105 senses RF energy, RFSEEN is asserted and digital logic circuit 25 tests to determine whether there is a valid incoming message for that particular host device. If there is, it will cause a transition to the active mode of operation and provide the processor with the fast clock signal via CLKO.

The wakeup logic 110 has a timeout for the receiver logic 105 to sense RF energy on all of the selected channels, and if RFSEEN is not asserted, will disable the high speed clock oscillator 109, to go back to the low power sleep mode.

Figure 11:
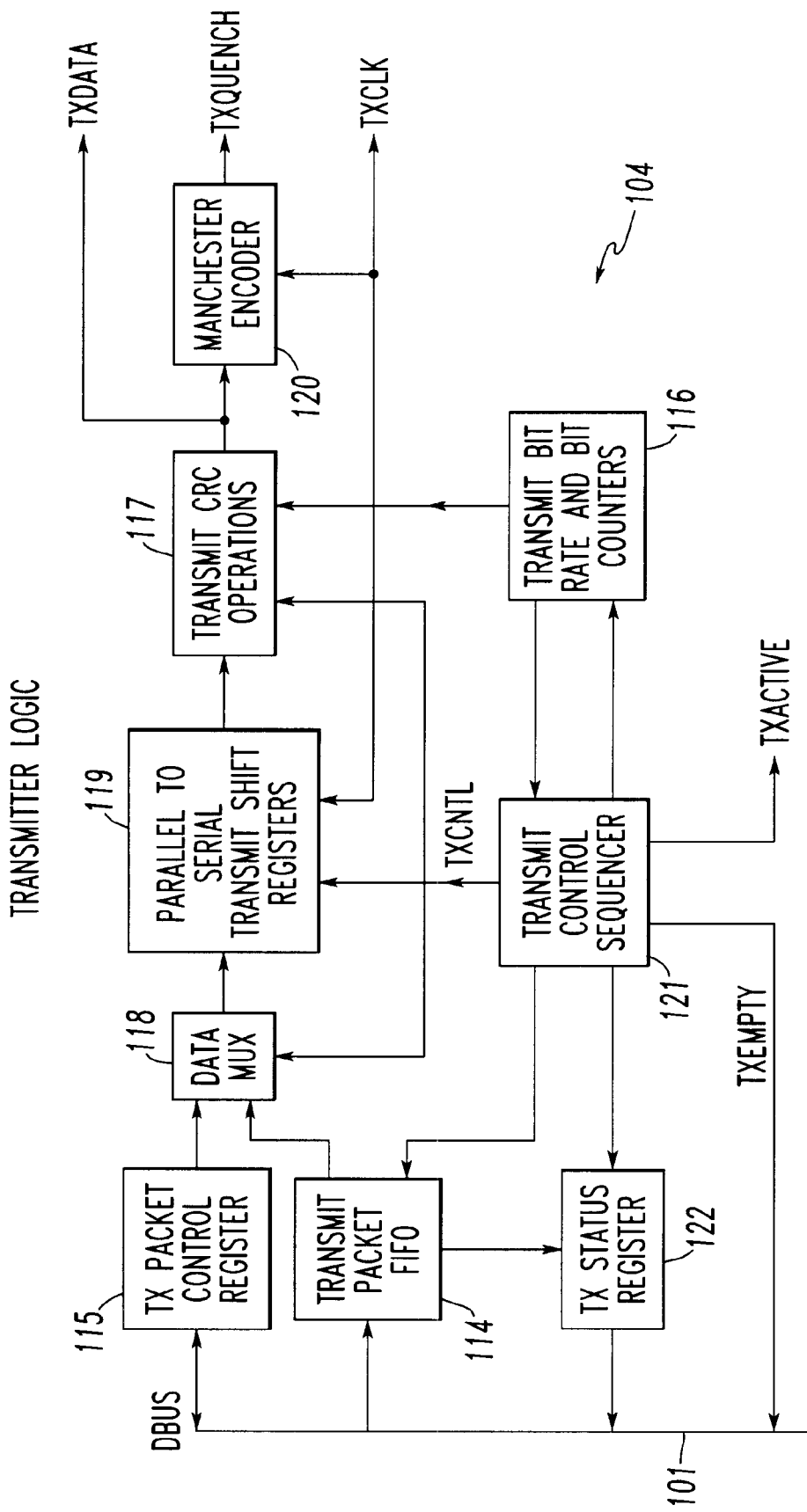
FIG. 11 is a block diagram of the transmitter logic circuit of FIG. 9.

The transmitter logic 104 detailed in FIG. 11 operates off the high speed clock 109 (FCLK FIG. 10), and is disabled when in the sleep mode. If the processor 26 needs to send a packet to another host modem, the packet information is first written as a sequence of writes to a transmit FIFO 114 for the packet sequence of bytes of information. This information contains the addressing, packet number, length, and all other parameters needed to generate the packet. The FIFO length is much smaller than the packet length, requiring the processor 26 to monitor the transmitter and periodically load additional information to the transmit FIFO 114. To begin a transmission, the type of packet and overall packet length in bytes are written to the transmit packet register 115.

When transmit control sequencer 121 senses the completion of the write operation, it uses the type of packet to set up transmit bit counters 116. The counters are used by the sequencer 121 for enabling the transmit CRC logic 117, such that the CRC calculation begins and ends at the appropriate points in the packet transmission. The transmit control sequencer 121 causes TXACTIVE to be asserted. This causes the RF circuit control 107 (FIG. 9) to force the transmit control signal TON to become active while disabling the receive control signal RON. This sets up the RF circuitry for the transmit mode of operation. Once TON is asserted, the start of the packet is generated by the transmit control sequencer 121 using the type of packet written to it.

The start of a packet is passed as a byte, through a multiplexer 118 to parallel-to-serial transmit shift register 119. The transmit data counters 116 are then incremented at the transmit bit rate along with the transmit shift register 119 causing the generation of a serial information signal. The sequencer 121 monitors the counters and periodically reads the transmit FIFO 114 every 8 bit clock cycles, passing the bytes of information through the multiplexer 118 to the transmit shift register 119.

The serial bit output of transmit shift register 119 drives the input to the CRC block 117, passing through to the CRC serial output during the start of the packet, until such time that the CRC logic is commanded to shift out the CRC value. When the bit counter 116 indicates to the transmit control sequencer 121 that the start of the packet is completed, the transmit CRC logic 117 is enabled for calculation of CRC based on the serial bits from the transmit shift register 119. When the bit counter 116 indicates that the final packet information has been read from the transmit FIFO 114 and shifted out by the transmit shift register 119, the CRC logic 117 is enabled to serially shift out its internal value onto the serial information signal. When the CRC value has been fully shifted out, the CRC serial output is forced to a value set in a register in the transmit control sequencer 121, such register being preset by processor 26 during the time that it is loading FIFO 114 with the contents of an information packet. This value is held for an additional 8 bits, serving as the hold portion of the transmitted packet. The CRC serial output and TXCLK are then exclusive OR'ed to form a Manchester encoded signal TXQUENCH.

As will be subsequently described, the timing of the transmit bit rate is such that the Manchester transmit symbol takes the same time as ten receiver quench cycles. The transmit control sequencer 121 uses the transmit bit counter 116 to delay for the hold portion, and then shuts down the transmitter logic 104 (FIG. 9) deasserting TON. At any time, the transmit control sequencer status may be read by the processor 26, by means of transmit status register 122, detailing the amount sent and the transmit FIFO 114 status, such as empty, half full, full. When the transmit FIFO 114 goes empty, the transmit control sequencer 121 will assert an interrupt request TXEMPTY that the processor interface 100 (FIG. 9) uses to signal the processor 26 to send more packet information.

Figure 12:
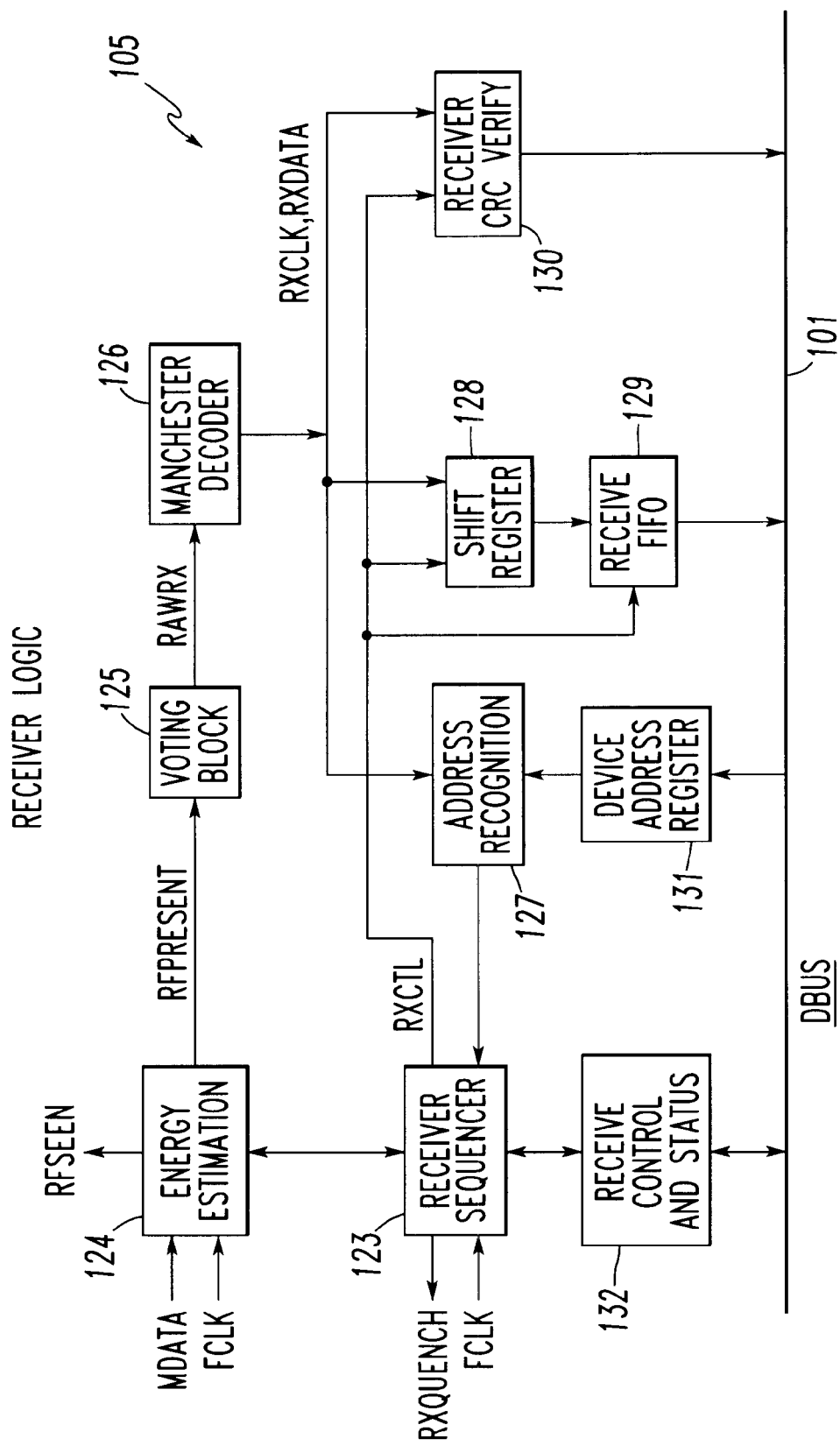
FIG. 12 is a block diagram of the receiver logic circuit of FIG.9.

The receiver logic 105 shown in more detail in FIG. 12, contains a receive sequencer 123 which coordinates the timing of RXQUENCH, provided to the RF circuitry 20, with the relative timing of MDATA from the comparator 58 (FIG. 6). Using the energy estimation block 124, each receiver quench cycle generates a digital signal RFPRESENT which is a binary estimate of whether the modem has sensed another's transmission. The estimate is done within the energy estimation block 124, with RFPRESENT passed through a voting block 125. The voting block serves to average the estimate, with the output indicating the majority of a programmable prior number of estimates. The averaged output RAWRX passes to the Manchester decoder 126 for RXCLK's clock recovery and extraction of the serial data RXDATA. RXDATA and RXCLK in turn drive the shift register 128, receiver CRC block 130, and address recognition block 127.

The output of shift register 128 passes to the receive FIFO 129. The address recognition block 127 matches the value of device address register 131 value to the bits within the recovered information packet. If a match is found, the contents of shift register 128 are loaded into the receive FIFO 129 under control of signal RXCTL from the receive sequencer 123. The receive sequencer 123 senses the start of an information packet by the Manchester decoder 126 providing a synchronization detect signal. Counters within the receive sequencer 123 count the number of bits received to determine when the receive CRC block 130 should be reset or calculating. The receive sequencer 123 is enabled and its receive status may be read by processor 26 through the receive control and status circuit 132, connected to data bus 101. This status includes the status of receive FIFO 129, address match status, and CRC status.

Figure 13:
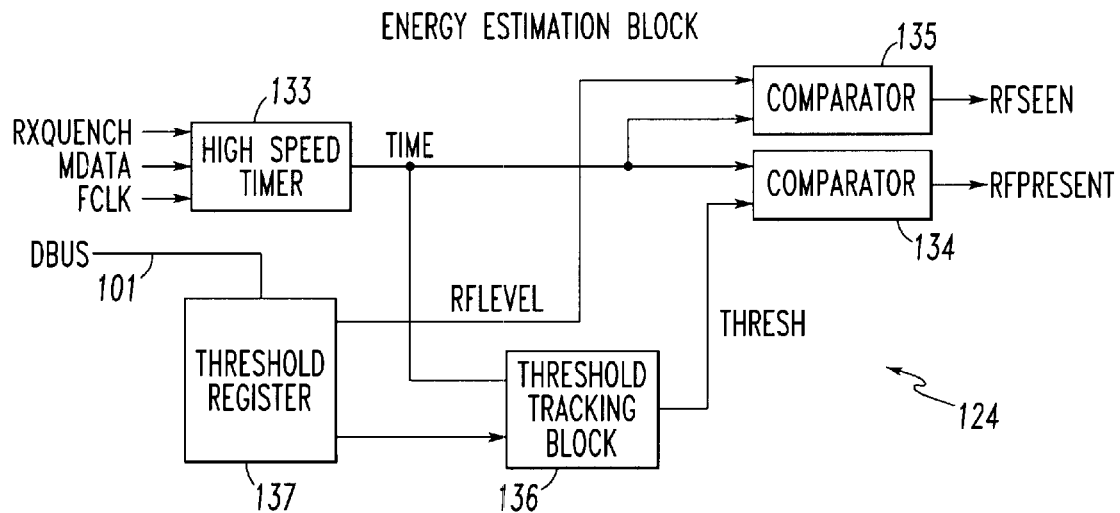
FIG. 13 is a block diagram of the energy estimation block of FIG. 12.

The energy estimation block 124, shown in more detail in FIG. 13, contains a high speed timer 133 that measures the timing between the deassertion of the RXQUENCH signal, enabling loop oscillations to occur, and the MDATA signal indicating that the loop energy exceeds the reference level R. The measured timing value TIME will be inversely proportional to the detected RF energy since, as described in FIG. 4, At will have a smaller value with RF energy present and a larger value when not present. A comparator 134 compares TIME to a threshold value THRESH, with it's output RFPRESENT set if TIME<THRESH. A second comparator 135 compares TIME to RFLEVEL, with it's output RFSEEN set if TIME<RFLEVEL. RFSEEN is used in the scanning mode to allow searching for any signals which may be present.

The timing threshold THRESH, in a preferred embodiment, may be adjusted at the start of every RF packet, since the distance to the remote host which is transmitting can be changing, causing the sensed energy to vary. This adjustment is restarted in the threshold tracking block 136 when the Manchester decoder 126 (FIG. 12) senses sync or at the beginning of a receive mode. A threshold register 137 allows adjustment of the threshold parameters by the processor 26 via a signal on the data bus 101.

Figure 14:
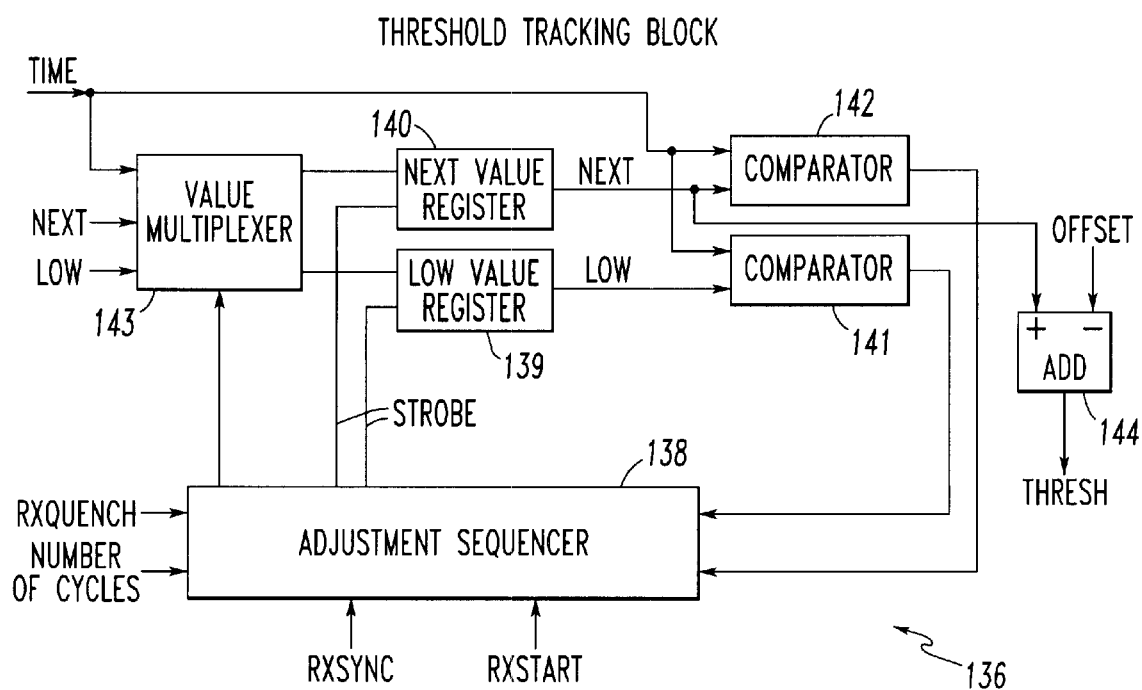
FIG. 14 is a block diagram of the threshold tracking block of FIG. 13.

By way of example, the threshold tracking block 136 will compare the measured TIME to stored values, and maintain the two lowest values measured. As illustrated in FIG. 14, an adjustment sequencer 138 senses the receive quench signal RXQUENCH causing the loop oscillations to be turned off and begins to compare TIME to the two registers, LOW 139 and NEXT 140. Comparator 141 senses if TIME is less than LOW, and comparator 142 senses if TIME is less than NEXT. LOW and NEXT are loaded with new values based on the following logic:

If TIME<LOW, load LOW to NEXT, load TIME to LOW
If TIME not<LOW and TIME<NEXT, load TIME to NEXT
If TIME not<NEXT, no loads done This logic is done by the adjustment sequencer 138, based on comparators 141 and 142, controlling multiplexer 143 and strobes to LOW and NEXT registers 139 and 140. When the adjustment is restarted, the two registers are set to the lowest possible time value. After a sync character is detected, the two lowest values are held constant until the next restart of a threshold adjustment. A programmable offset is added to the next to lowest value by block 144 to form THRESH.

Figure 15:
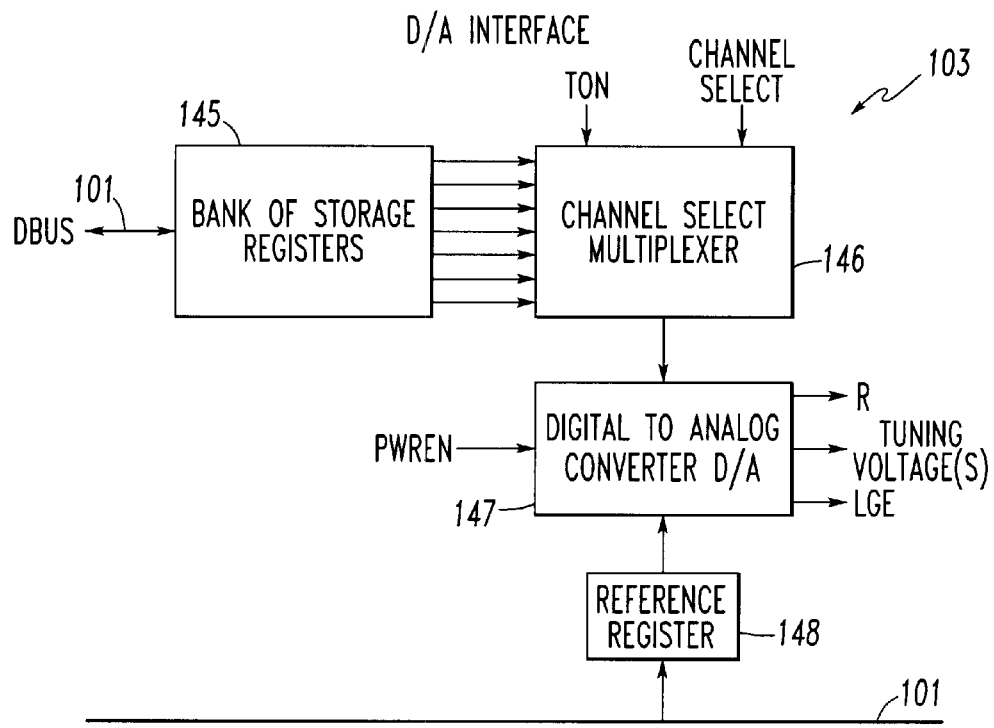
FIG. 15 is a block diagram of the digital-to-analog interface of FIG. 9.

The D/A interface 103 of FIG. 9 is illustrated in more detail in FIG. 15. This circuit is utilized for tuning of the loop varactors 67 and 77 and for providing reference voltage R (FIG. 6) and loop gain control signal LGC. There are multiple channels each requiring differing tuning voltages. A bank of registers 145 has the preset values, with a channel select multiplexer 146 choosing the appropriate value based upon transmit, receive, and channel in use. This in turn is used to set a D/A converter 147 which provides the appropriate tuning voltage. The converter 147 is powered off in the sleep mode, with the outputs active, in response to PWREN, only in the transmit, scan, or receive modes of operation. The channel select comes from the wakeup logic 110 (FIG. 10) which sequences through all channels during a scan mode. The processor 26 preloads the bank of registers with tuning voltage parameters determined during factory calibration and stored within a nonvolatile memory of the processor 26. The same is true for the reference level R and signal LGC, which are loaded into register 148 by the processor 26 via databus 101.

Figure 16:
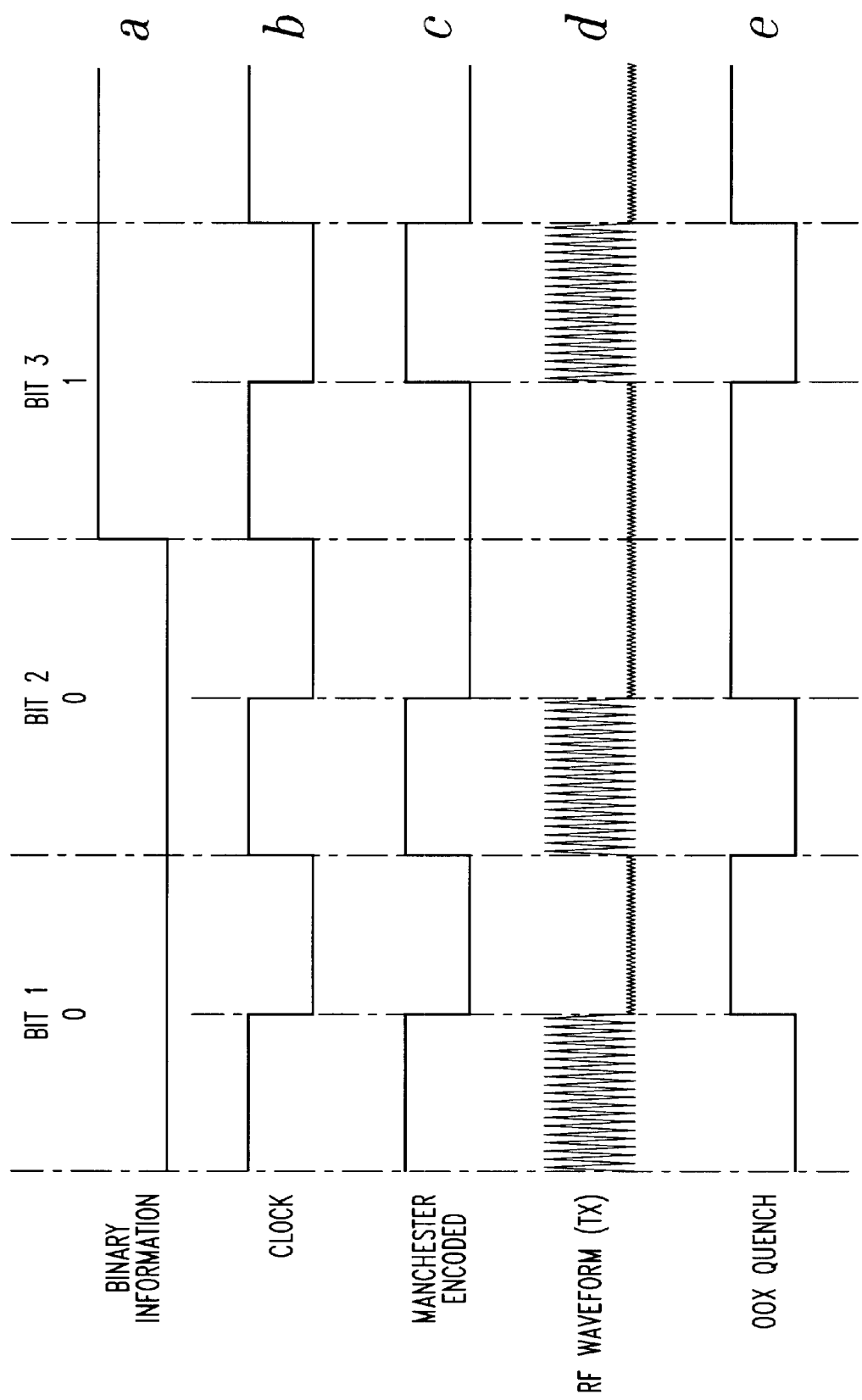
FIG. 16 shows waveforms illustrating On/Off Keying.
Figure 17:
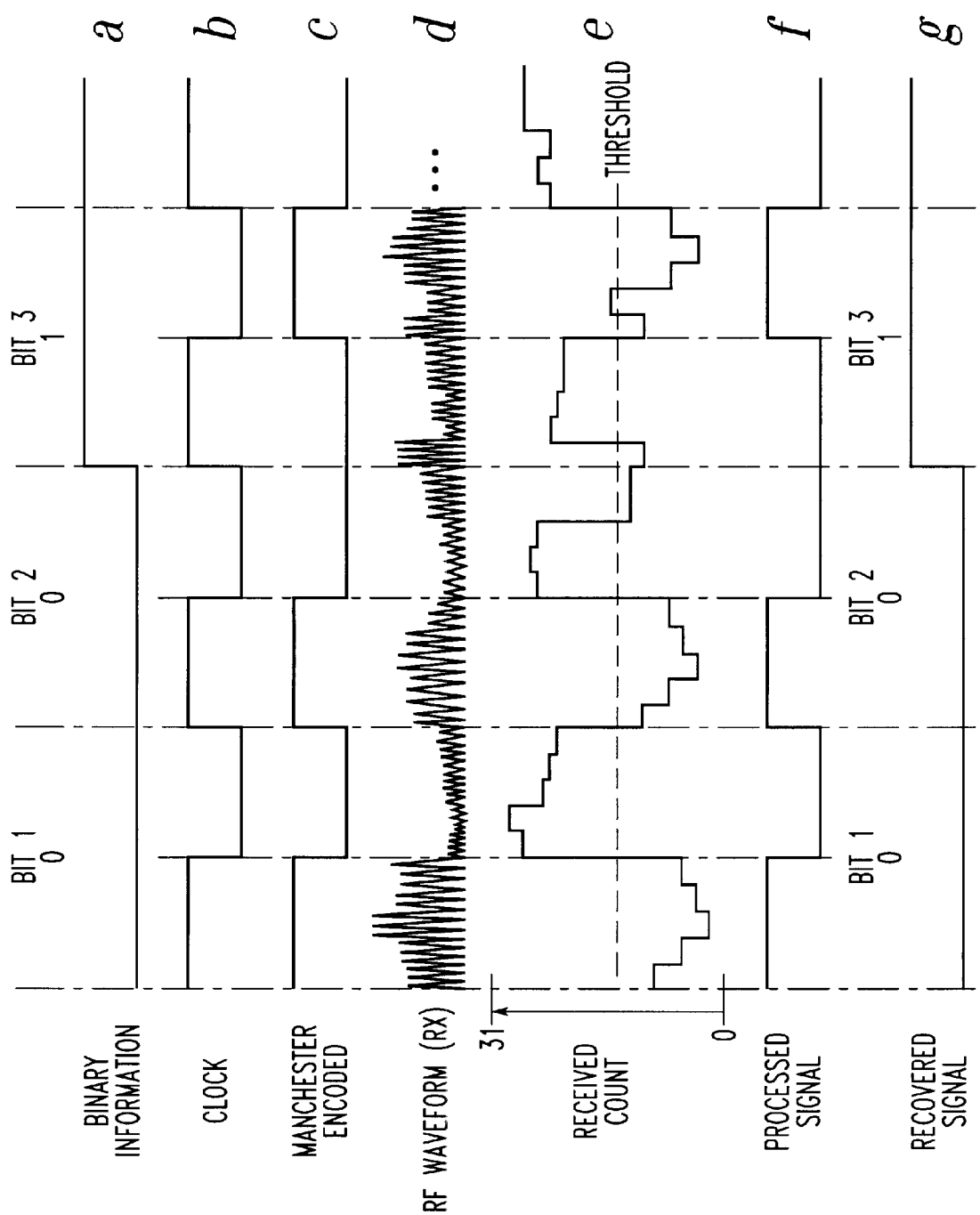
FIG. 17 shows waveforms illustrating the recovery of bit information.
Figure 18:
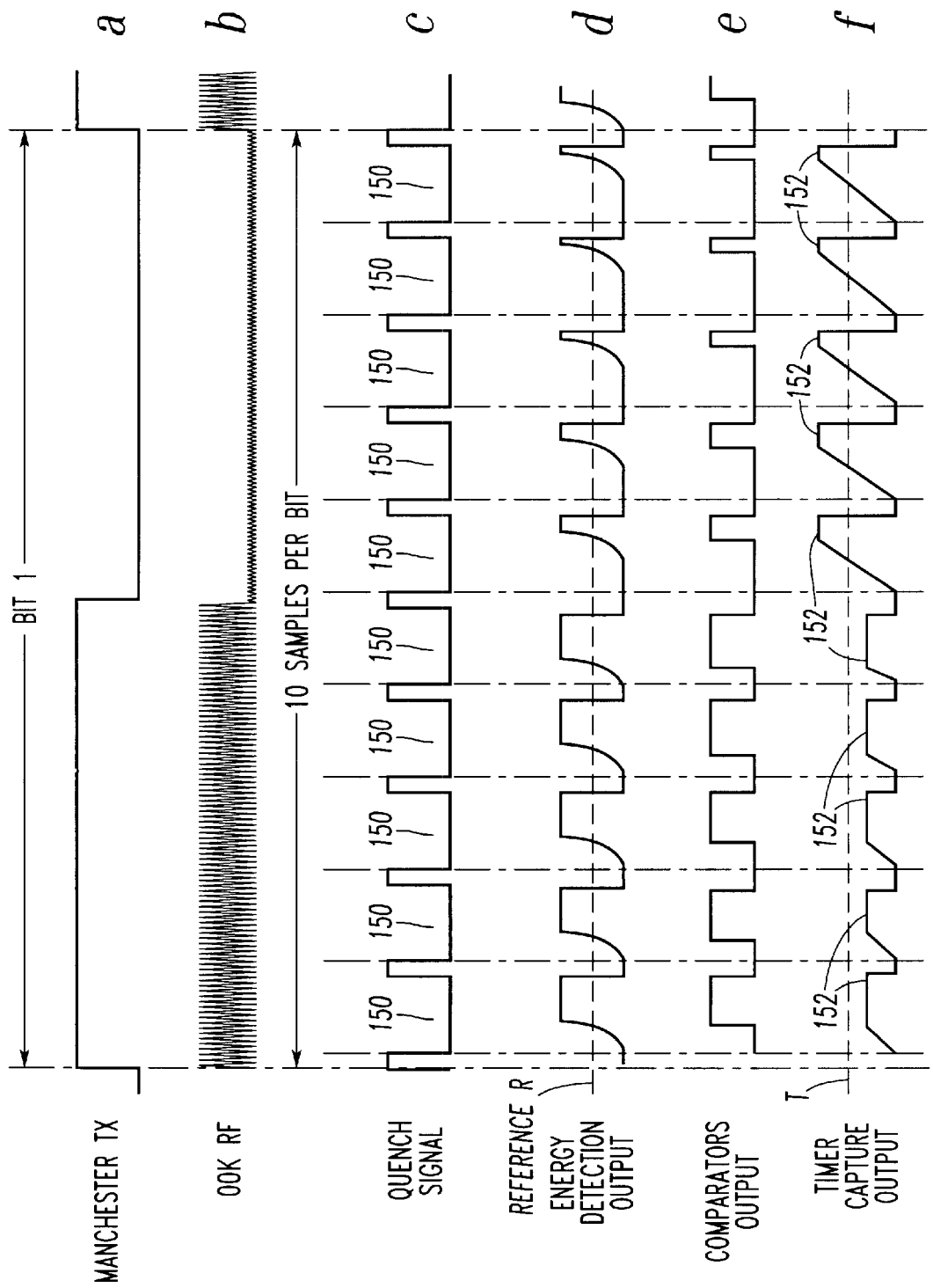
FIG. 18 shows waveforms illustrating the recovery of bit information, in more detail.

A typical recovery of information bits transmitted by On/Off Keying from a transmitting host to a receiving host is illustrated by the waveforms of FIGS. 16, 17 and 18. In FIG. 16, three bits, 001, of a packet to be transmitted are shown in FIG. 16a, which, when combined (exclusive OR'ed) with the clock of FIG. 16b results in the Manchester encoded signal of FIG. 16c. An idealized RF waveform of FIG. 16d is transmitted by application of the quench signal of FIG. 16e, the process being controlled by the transmitter logic 104 and RF circuit control logic of FIG. 9.

FIG. 17 illustrates the information recovery. The binary information signal, clock and Manchester encoded signal of FIG. 16 are reproduced as the waveforms of FIGS. 17a, 17b and 17c. The actual received RF signal, as illustrated in FIG. 17d, however, contains extraneous noise, such as may be caused by some other transmitter. This signal is sampled a predetermined number of times, for example, ten times for each bit, by operation of the circuitry of FIGS. 12, 13 and 14. Each sample of the RF waveform results in a corresponding time count, with a relatively low count being indicative of a binary 1 and a relatively high count being indicative of a binary 0.

This sampling is further illustrated in FIG. 18 which is an expanded scale for one bit. Let it be assumed that transmission has been ongoing such that a threshold level T has been determined and that sync has been established. The waveform of FIG. 18a shows a Manchester encoded signal and that of FIG. 18b shows an idealized corresponding received RF signal. Every time the quench signal illustrated in FIG. 18c is deasserted, at times 150, oscillations build up in the superregenerative circuit 20 (FIGS. 3 and 4) and a timing count is initiated. When the energy build up exceeds the reference level R, as illustrated in the waveform of FIG. 18d, the comparator 58 will provide an output, FIG. 18e, to stop the timing function. The timer count build up is shown by waveform 18f, with the final count for each particular sample being represented by a level portion 152, some of which are below the threshold T (indicative of a 1) and others of which are above the threshold (indicative of a 0).

Referring once again to FIG. 17, the particular count resulting from each sample is illustrated in FIG. 17e, wherein each bit has 10 samples, which, for a 5 bit counter can range from 0 to 31 (32 values). A 6 bit counter would allow for a range of 64 values.

Due to actual RF interference present not all of the counts representing a 1 are of equal value as depicted in the idealized presentation of FIG. 18 nor are all below threshold T. The same is true of all counts representing a 0 being equal or above the threshold. In order to enhance proper signal recovery therefore, the circuitry includes means for averaging the counts (voting block 125, FIG. 12), with the output indicating the majority of a programmable prior number of estimates. For example, a majority vote of 3 out of 5 will be determinative.

With this majority voting, the waveform of FIG. 17f represents the 1 and 0 values resulting from the counts of FIG. 17e, and Manchester decoding provides the original signal, as illustrated in FIG. 17g. For ease of presentation, the recovered signal is shown on the same timescale as the original signal of FIG. 17a. It is to be understood however, that there will be a small processing delay.

Figure 19:
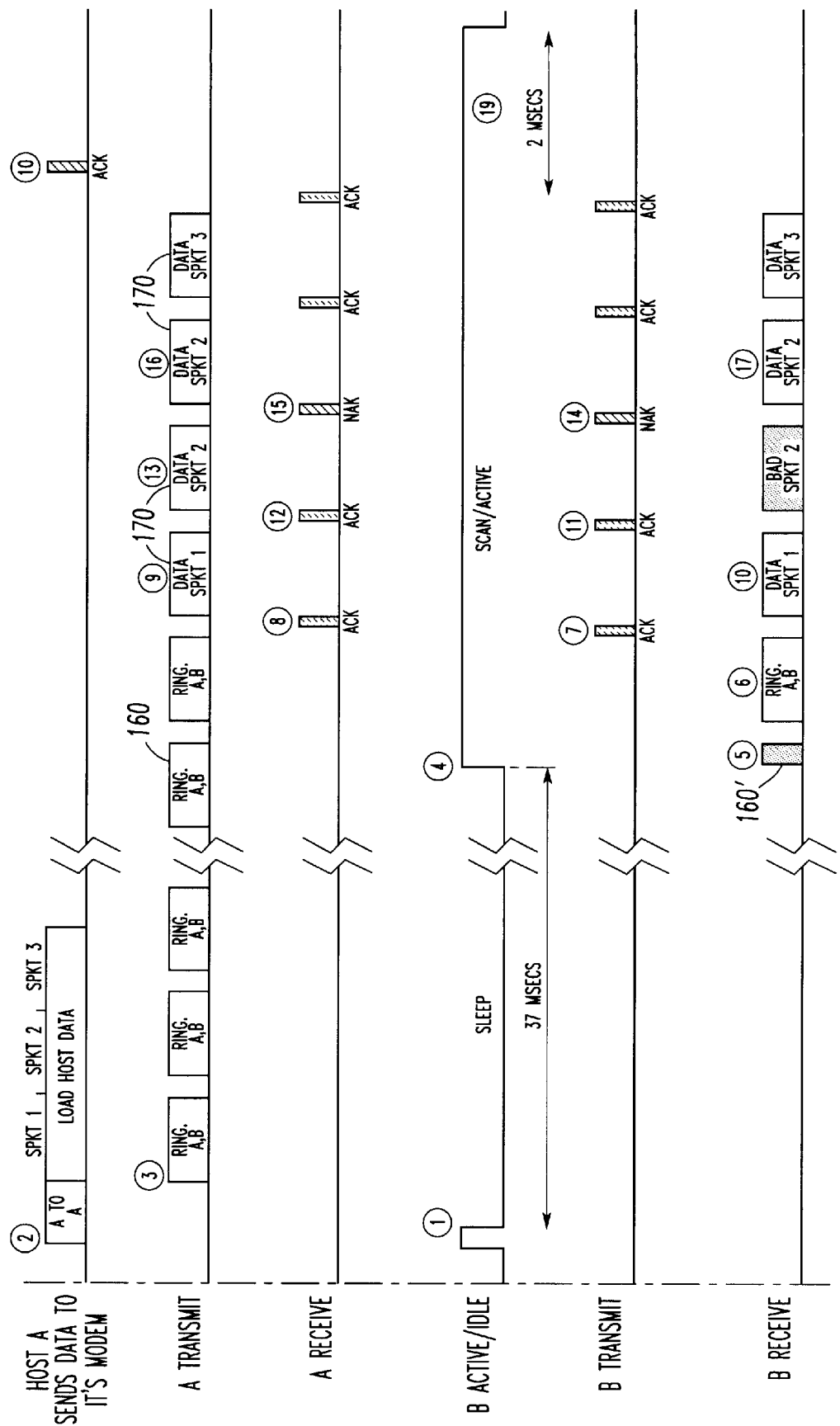
FIG. 19 is a timing diagram illustrating the transmission and reception of information.

A typical information transfer between two hosts, A and B (via their respective modems) is illustrated, by way of example, in FIG. 19 wherein reference times are denoted by the circled numerals. Let it be assumed that host A is to transfer certain information to host B which at time 1 is in a scanning state for a programmable number of bit times, listening for RF transmissions sequentially on all four channels. At time 2 host A is just loading the data into its modem for transmission to B.

At time 3, after establishing that there is no other link activity, A commences transmitting an information signal in the form of a ring packet, and will continue to do so a number of times, for example 48, or until a ring packet is answered, whichever occurs first. At this time B is in a sleep mode for a programmed period of time, 37 ms being illustrated, and therefore does not respond to the ring packets until it wakes up and starts scanning at time 4 and detects a transmission on the particular channel.

Figure 20:
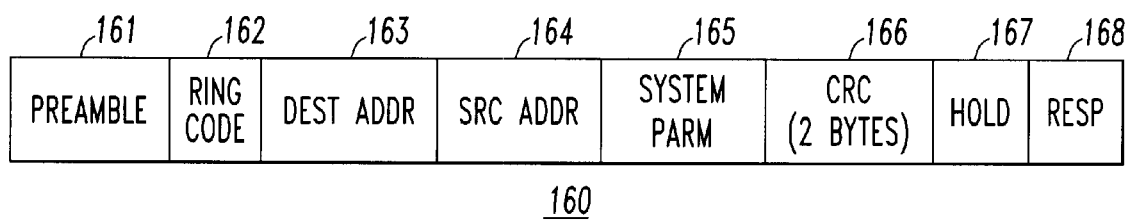
FIG. 20 is a presentation of the contents of a ring packet.

A typical ring packet format is illustrated in FIG. 20, to which reference is now made. The number of bits in each field is given by way of example. The ring packet 160 includes a preamble 161 which is comprised of an initial sync portion followed by 5 bits, for coarse and fine clock synchronization. The ring code 162 is a two bit field, 00, to identify the packet type (ring).

Each modem is provided with an identification or address, which may be unique relative to all the other modem addresses, and each host or modem has a listing of all the addresses of the other hosts. To send to a particular host, that host's address is used and is identified in the 32 bit destination address field 163, with the senders 32 bit address being identified in the source address field 164. A system parameter field 165, consisting of 8 bits, may be included and may be used for a variety of tasks such as defining any network changes (e.g. software changes or establishing an error correcting code, etc.). The 16 bit CRC field 166 is the cyclic redundancy check.

A hold field 167 is 8 bits long consisting of all 0's and operates to hold open the link for destination acknowledgment. A hold field of all 1's indicates the last ring packet. The last field 168 is a response field reserved for the receiving host to acknowledge the transmitting host with a positive acknowledge ACK (information received) or a negative acknowledge NAK (information not received). Such acknowledgments also include a sync portion as well as an acknowledgment code. With a bit time of 8.68 µs, for example, each ring packet transmission lasts less than 1 ms.

Referring once again to FIG. 19, at time 4, B is scanning during ring packet 160 and stays scanning to receive only a portion, 160', of packet information at time 5. At time 6 the entire ring packet is received and B responds with a positive acknowledgment ACK at time 7, and received back at A at time 8, at which time B goes to the active mode of operation. Having established the correct communication link with B, A then transmits the first of a plurality of data packets 170 at time 9.

Figure 21:
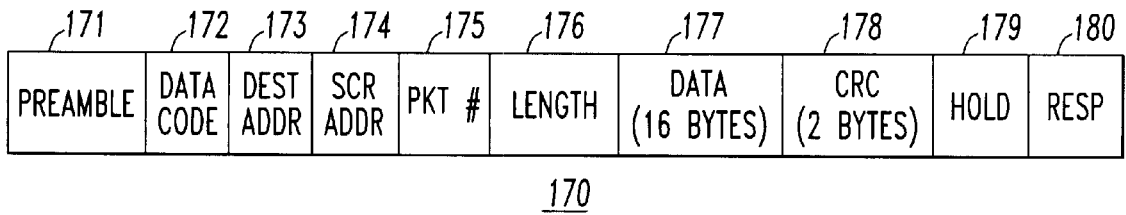
FIG. 21 is a presentation of the contents of a data packet.

A typical information signal in the form of data packet 170 is illustrated in FIG. 21. Data packet 170 includes a preamble 171 which is the same as that of the ring packet 160. The data code 172 is a two bit field with a value of 11, to identify the packet type (data). After a valid link and synchronization it is not necessary to utilize a 32 bit address. Therefore the destination address field 173 and source address field 174 may be reduced to the least significant byte, that is 8 bits each.

The amount of data to be transmitted may be longer than can be accommodated in one transmission. In such case, the data is transmitted in several sub-packets. The packet field 175 is an 8 bit field which will contain the sub-packet number. The most significant bit of the packet field 175 is set to indicate when the last sub-packet is sent.

The length field 176 is an 8 bit field indicating the number of bytes to follow in the data field 177, which contains the transmitted data. The remaining three fields 178, 179 and 180 are similar to the CRC, hold and response fields discussed with respect to FIG. 20. Transmission of a data packet is about 1.7 ms, slightly longer than that of a ring packet.

In FIG. 19, the first data sub-packet is transmitted by A at time 9 and received by B at time 10. An acknowledgment ACK is transmitted by B and received by A at respective times 11 and 12. The next transmitted sub-packet at time 13, however, for some reason is not received by B, which, knowing that a sub-packet was to be sent, transmits a NAK at time 14. Reception of this NAK by A at time 15 causes A to retransmit the second sub-packet at time 16. Successful reception of this transmission at time 17 results in a proper acknowledgment.

The process is continued until the last of the sub-packets have been transmitted and successfully received. After A has received the last sub-packet ACK signal from B, A's modem will, at time 18, send an ACK signal to its host. B will continue scanning the link for any additional information which A may send. If no additional information is received within 2 ms, as indicated at time 19, B will go into the sleep mode once again.

It is to be noted that if another host wakes up and senses A's transmission, it will establish sync, but will go back to the sleep mode when it determines from the destination address that the transmission was intended for another host. The system however will allow for information exchange between other hosts simultaneously on respective other channels.

For some systems it may be desirable for a host to communicate with all other host in the system. In such case the transmitting host may transmit a "broadcast" address to which all of the other hosts are responsive. For broadcast messages the ring packet may be transmitted 48 times to ensure that all hosts within range will have time to wake up and receive the message. For a broadcast no acknowledgment signal ACK need be sent by the receiving hosts.

Although the present invention has been described with a certain degree of particularity, it is to be understood that other programmed scenarios are possible and that various substitutions and modifications may be made without departing from the spirit and scope of the invention as defined in the appended claims.

What is claimed is:

1. An RF modem used in conjunction with a host device, comprising:
   (A) a superregenerative circuit including an oscillator circuit operable to receive modulated RF information signals;
   (B) control means for periodically providing control signals to said superregenerative circuit in a first period to quench oscillations of said oscillator circuit and in a second period to allow buildup of oscillations;
   (C) means operable during said second period to obtain a time indication of the time between the beginning of said second period and the time that said oscillations have built up to a predetermined reference level;
   (D) means for accumulating said time indications;
   (E) means for recovering said information signal based on said accumulated time indications; and
   (F) means for interchanging information with said host device.

2. An RF modem according to claim 1 wherein:
   (A) said superregenerative circuit is additionally operable to transmit information signals, including information received from said host device.

3. An RF modem according to claim 2 wherein:
   (A) said information signals are in binary format.

4. An RF modem according to claim 2 wherein:
   (A) said transmission of said information signals by said superregenerative circuit is by On/Off keying.

5. An RF modem according to claim 3 wherein:
   (A) said information signals are encoded prior to transmission.

6. An RF modem according to claim 5 wherein:
   (A) the encoding of said information signals is by Manchester encoding such that there is always transmitted energy for each information bit.

7. An RF modem according to claim 3 wherein:
   (A) said means for recovering includes a) means for establishing a threshold value based upon said time indications and b) means for comparing said time indications with said threshold value for determining whether a value represents a binary 1 or a binary 0.

8. An RF modem according to claim 7 which includes:
   (A) means for obtaining a plurality of said time indications for each information bit; and
   (B) means for averaging said time indications for each information bit for determining whether a value represents a binary 1 or a binary 0.

9. An RF modem according to claim 7 wherein said modem is transmitting to a distant other said modem and which includes:
   (A) means for adjusting said threshold value to accommodate for changing distances between said modems exchanging information.

10. An RF modem according to claim 3 wherein:
    (A) said control means is operable to supply a predetermined number of said control signals in the period of one binary bit.

11. A portable, low-power, battery operated RF modem used in conjunction with a host device, comprising:
    (A) a superregenerative circuit operable to transmit and receive RF information signals;
    (B) control means for governing operation of said superregenerative circuit during said transmitting and receiving of said information signals;
    (C) said control means including a timer, a relatively fast oscillator and a relatively slow oscillator, said relatively slow oscillator providing an output clock signal to said timer;
    (D) said modem being operable in an active mode and in a power saving sleep mode of operation, and when in said active mode said relatively fast oscillator provides an output clocking signal to govern predetermined operations, and when in said power saving sleep mode only said relatively slow oscillator provides an output clocking signal;
    (E) said modem reverting to scanning mode of operation from said power saving sleep mode, upon said timer having attained a predetermined count of said output clocking signal of said relatively slow oscillator;
    (F) said modem being operable, during said scanning mode to test to see if any RF information signals are present; and
    (G) means for interchanging information with said host device.

12. An RF modem according to claim 11 wherein:
    (A) said modem is additionally operable to switch to said active mode from said sleep mode when said host device has information to be transmitted.

13. An RF modem according to claim 11 wherein:
    (A) said superregenerative circuit is operable at a plurality of different frequencies, constituting different channels;
    (B) said modem is operable during said scanning mode to test to see if any RF information signals are present on any of said channels.

14. An RF modem according to claim 11 wherein:

(A) said predetermined count is selectively programmable.

15. An RF modem coupled to a host device, for transmitting RF information signals to, and receiving RE information signals from, another RE modem coupled to a host device, in an array of host devices, comprising:
    (A) transmitter/receiver means operable at a plurality of different frequencies, constituting a plurality of separate channels;
    (B) control means for providing control signals to said transmitter/receiver means and for establishing an RE signal link with a designated said modem within said array, on a particular one of said channels, whereby other modems of said array can simultaneously establish RF signal links on other channels of said plurality;
    (C) said control means being operable to cause said transmitter/receiver means to transmit a plurality of ring packets, each including an initial sync portion, to said designated modem, which, if it successfully receives said ring packet, will acknowledge said receipt by transmitting an acknowledgment signal on said same channel, said acknowledgment signal including an initial sync portion;
    (D) said modem, in response to said acknowledgment signal thereafter being operable to transmit to said designated modem, one or more data packets, on said same channel, each said data packet including an initial sync portion; and
    (E) means for interchanging information with said host device.

16. An RF modem according to claim 15 wherein:
    (A) said transmitter/receiver means will transmit until a predetermined number of said ring packets have been sent or until a said acknowledgment signal has been received, whichever occurs first.

17. An RF modem according to claim 15 wherein:
    (A) if an expected one of said data packets is not properly received by a designated receiving modem, said receiving modem will transmit a signal (NAK) indicating an improper receipt.

18. An RF modem according to claim 15 wherein:
    (A) each said modem in said array of host devices has a predetermined address designation.

19. An RF modem according to claim 18 wherein:
    (A) each said modem has a unique address relative to all the other modems in said array of host devices.

20. An RF modem according to claim 18 wherein:
    (A) said control means is operable to cause said transmitter/receiver to transmit a broadcast signal to which all of the modems in said array of host devices are responsive, without the requirement of designating a particular modem's address.

21. An RF modem according to claim 15 wherein:
    (A) in addition to said sync portion said ring packet also includes, a field indicating the packet type, a destination address field, a source address field, and at least a hold field to hold open a link for receipt acknowledgment.

22. An RF modem according to claim 21 wherein:
    (A) said hold field is alternatively operable to indicate the last ring packet of said plurality of ring packets.

23. An RF modem according to claim 15 wherein:
    (A) in addition to said sync portion said data packet also includes, a field indicating the packet type, a destination address field, a source address field, and at least a data field which contains data to be transmitted and a hold field to hold open a link for receipt acknowledgment.

24. An RF modem according to claim 23 wherein:
    (A) said destination address field, and said source address field of said data packet are of a length which is less than that of said destination address field and said source address field of said ring packet.

* * * * *